United States Patent
Bradshaw et al.

(10) Patent No.: US 6,264,295 B1
(45) Date of Patent: Jul. 24, 2001

(54) RADIAL PRINTING SYSTEM AND METHODS

(75) Inventors: George Lynn Bradshaw; Markus Willard Covert, both of Palo Alto; Randy Quinn Jones, Sunnyvale; Michael Keith Sorensen; Jan Eugene Unter, both of San Jose, all of CA (US)

(73) Assignee: Elesys, Inc., Sunnyvale, CA (US)

( * ) Notice: Subject to any disclaimer, the term of this patent is extended or adjusted under 35 U.S.C. 154(b) by 0 days.

(21) Appl. No.: 09/062,300

(22) Filed: Apr. 17, 1998

(51) Int. Cl.[7] .................................. B41J 2/01; B41J 2/15
(52) U.S. Cl. .................................. 347/2; 347/12; 347/40; 358/1.11; 358/1.18
(58) Field of Search .................................. 347/40, 2, 105, 347/102, 12; 346/137; 369/219, 221; 358/1.18, 1.11

(56) References Cited

U.S. PATENT DOCUMENTS

| | | | |
|---|---|---|---|
| 4,084,195 | * 4/1978 | Pereira | 347/41 X |
| 4,110,594 | 8/1978 | May . | |
| 4,556,966 | * 12/1985 | Bricot et al. | 369/52.1 |
| 4,571,601 | 2/1986 | Teshima . | |
| 4,581,636 | 4/1986 | Blaker et al. . | |
| 4,665,492 | 5/1987 | Masters . | |
| 4,721,969 | * 1/1988 | Asano | 347/116 |
| 4,739,415 | * 4/1988 | Toyono et al. | 347/40 X |
| 4,780,712 | 10/1988 | Itaya et al. . | |
| 4,967,286 | 10/1990 | Nomula et al. . | |
| 5,041,846 | * 8/1991 | Vincent et al. | 347/102 X |
| 5,154,957 | * 10/1992 | Yamada et al. | 347/264 X |
| 5,317,337 | 5/1994 | Ewaldt . | |
| 5,395,181 | 3/1995 | Dezse et al. . | |
| 5,444,687 | * 8/1995 | Okumura | 369/50 |
| 5,468,076 | * 11/1995 | Hirano et al. | 347/8 X |
| 5,518,325 | 5/1996 | Kahle . | |
| 5,597,590 | 1/1997 | Tanimoto et al. . | |
| 5,634,730 | * 6/1997 | Bobry | 347/2 X |
| 5,656,229 | 8/1997 | Tanimoto et al. . | |
| 5,700,562 | 12/1997 | Sugimoto et al. . | |
| 5,781,221 | 7/1998 | Wen et al. | 347/232 |
| 5,967,676 | 10/1999 | Cutler et al. | 400/70 |
| 6,019,151 | * 2/2000 | Wen et al. | 156/387 |

FOREIGN PATENT DOCUMENTS

| | | |
|---|---|---|
| 0027734 | 4/1981 | (EP) . |
| 0622212 | 11/1994 | (EP) . |
| 2320912 | 7/1998 | (EP) . |
| 07101039 | 4/1995 | (JP) . |
| 09265760 | 10/1997 | (JP) . |
| 09306144-A | * 11/1997 | (JP) . |

* cited by examiner

*Primary Examiner*—David F. Yockey
(74) *Attorney, Agent, or Firm*—Beyer, Weaver&Thomas, LLP

(57) ABSTRACT

Method and apparatus for receiving an image source representative of an image to be printed on an outer surface of a rotating media is described. The image source has a plurality of image points. A radial printing system is described that includes an imaging system configured to convert the plurality of image points into a polar-based representation of the image and a head assembly coupled to the imaging system for outputting the polar-based representation of the image onto the rotating media. The rotating media may represent a compact disk, wherein an inner surface of the compact disk is configured to store digital data. Printing distortion is controlled by selecting a higher proportion of the polar points corresponding to a first radius is selected than of polar the points corresponding to a second radius.

19 Claims, 9 Drawing Sheets

RADIAL PRINTING SYSTEM AND METHODS

BACKGROUND OF THE INVENTION

The present invention relates to the manufacture of printing systems and methods for printing. More particularly, the present invention relates to a printing system that is configured to radially print onto a media that rotates in relation to a printing assembly.

Conventional printing systems typically utilize rectangular based bitmaps. In general, a conventional printing system prints onto a standard size rectangular-shaped media along a horizontal axis, for example, and the media is moved along a vertical axis. Typically, after the paper advances to a desired vertical location under a head assembly, the printing assembly moves across the paper to print an image onto the paper while the paper is held stationary. In sum, conventional printing systems generally implement movements within a rectangular coordinate system for printing onto media having standard sizes and shapes.

To facilitate discussion, FIG. 1 depicts a conventional printing system 10 in the form of a typical ink jet printer. As shown, the printing system 10 includes a print head 102, a roller 106, and an actuator 108. The print head 102 is configured for dispensing ink onto a print media 100, representing, for example, a rectangular sheet of paper. The actuator 108 is configured for moving the print head 102 across the print media 100. The roller 106 is configured for moving the print media 100 under the print head 102.

Typically, the roller 106 moves the print media 100 perpendicularly to the movement of the print head 102. That is, the media 100 travels under the print head 102 along a y-axis 110, and the print head moves over the media 100 along a x-axis 112.

The movements of the roller 106 and print head 102 generally occur during different time periods. For example, the roller 106 initially feeds the media 100 to an initial position under the print head 102. This initial position is typically at the top, left corner of the media 100. The roller 106 stops moving the media 100, and the media 100 is immobilized. After the media 100 stops moving, the print head 102 begins to dispense ink across the media 100 at a first y-axis position. For conventional bi-directional printers, the print head 102 moves and prints from the left side to the right side of the media. When the print head 102 reaches the right side of the media 100, the print head 102 typically stops while the roller 106 moves the media 100 to a second position along the y-axis 110. For example, when the print head 106 completes a first line, the roller 106 moves the media 100 up so that the print head 102 may then print a second line. After the roller 106 repositions the media 100, the print head 102 moves and prints from the right side to the left side of the media 100 at a second y-axis position.

Although conventional printing systems such as those described above are suitable for certain applications, they also have certain disadvantages. For example, since the print head 102, in bi-directional printers, moves and prints from left to right and then from right to left, the timing of the ink dispensement is relatively complex. That is, when the print head 102 is moving in the +x direction, ink must be dropped at a position to the left of the desired ink dispensement site on the media 100. In contrast, when the print head 102 is moving in the −x direction, ink must be dropped at a position to the right of the desired ink dispensement site on the media 100.

Also, if odd-shaped, or non-rectangular, media 100 were placed within a conventional rectangular based printer, the print head 102 and associated actuator 108 would necessarily be configured such that space was wasted. For example, for a CD-shaped media 100, the actuator 108 would have to be configured to allow printing across the full diameter of the CD. That is, the actuator 108 would necessarily move the print head across the entire diameter of the CD. In other words, the conventional printer will be configured to print within a rectangular area that encompasses the CD-shaped media. In sum, the actuator 108 of the conventional printer 100 is necessarily configured to print lines across a maximum width of the media 100. Consequently, the size of the actuator 108 in typical rectangular based printers must typically be configured to move the print head along a maximum width of the media 100.

Conventional printing systems 10 fail to provide an easy way for printing on non-standard size media, such as a label for a CD-ROM 104 shown in FIG. 1. Being circular in shape and too small and/or irregular in size to be properly handled by the paper handling system of conventional printer systems, the CD label must typically be attached in some manner to another regular-sized media (e.g., a sheet of paper) and fed as such into the conventional printer before printing can occur. Conventionally printing systems are also typically not able to handle inflexible media types, such as a CD itself, for example. Even for printers that do not require flexible media, one must typically add a special media holder for each type of non-standard media. Otherwise, the non-rectangular shape of the CD label causes difficulties in conventional printing systems, which are typically configured to handle media and print head movements in the rectangular system. Also, printing control systems (not shown), which control the movements of the print head 102, typically are not designed to direct the print head across media (e.g., 102) having variable widths along the x-axis 112, such as the circular-shaped CD label 104 of FIG. 1.

Conventional printers also fail to efficiently utilize all movements of the media 100 for printing. That is, the print head 102 stops dispensing ink onto the media 100, i.e., stops printing as the roller repositions the media 100. Thus, during operation of conventional printers, there may be a period of time during which no printing occurs.

In view of the foregoing, there is a need for an improved printing system, and more specifically, an improved printing system that efficiently implements simple movements for printing onto media having nonstandard size and shape.

SUMMARY OF THE INVENTION

To achieve the foregoing and other objects and according to the purpose of the present invention, a radial printing system for receiving an image source representative of an image to be printed on an outer surface of a rotating media is disclosed. The image source has a plurality of image points.

In one embodiment, the radial printing system includes an imaging system configured to convert the plurality of image points into a polar-based representation of the image and a head assembly coupled to the imaging system for outputting the polar-based representation of the image onto the rotating media. In an alternative embodiment, the rotating media represents a compact disk, wherein an inner surface of the compact disk is configured to store digital data.

In another embodiment, the radial printing system includes an imaging system configured to provide a print position look-up table having therein print position representations of the image points to print the representation of the image source onto the rotating media. The imaging system is also configured to obtain one of the print position representations from the print position look-up table for at least some of the image points of the image source. The radial printing system further includes a head assembly coupled to the imaging system for outputting the representation of the image source onto the rotating media based on the obtained print position representations of the image points.

In yet another embodiment, the radial printing system includes an imaging system configured to receive the image source and to associate individual data of the image points with respective ones of the ink dispensement areas on the platter within a rectangular address look-up table such that the representation of the image source may be printed onto the rotating media by the head assembly and a head assembly coupled to the imaging system for outputting the representation of the image source onto the respective ink dispensement areas of the rotating media based on the rectangular address look-up table.

The radial printer may further include a rotation motor configured to rotate the media and to provide rotation position data that indicates a current rotation position of the rotation motor and a servo system configured to receive the rotation position data from the rotation motor and to control the rotation motor responsive to the rotation position data.

In yet another embodiment, the radial printing system includes a platter for supporting the rotating media, a head assembly disposed above the platter for printing onto the rotating media, a rotation motor for rotating the platter, a servo system configured for controlling the rotation motor, and an imaging system coupled to the head assembly and configured to receive the image source and to associate each point on the representation of the image source to a particular ink dispensement area on the rotating media such that the image source may be printed onto the rotating media by the head assembly. The imaging system is further configured to reduce printing distortion that arises from matching the image points with respective ones of the ink dispensement areas and/or from a rotational motion of the rotating media.

In another embodiment, a method for reproducing an image on an outer surface of a rotating media is disclosed. Data representing the image is received. The data representing the image is converted into a polar-based representation of the image. A reproduction of the image on the rotating media is printed, using the polar-based representation of the image.

By way of another embodiment, the media is rotated in a substantially continuous manner. A rectangular based bitmap is received. The rectangular based bitmap has a plurality of rectangular data points, wherein each rectangular data point represents at least an associated one of the image data points of the image source. A first rectangular data point is obtained from the rectangular based bitmap. A print position look-up table that has print position representations for at least some of the plurality of rectangular data points is provided. One of the print position representations for the first rectangular data point from the print position look-up table is obtained and furnished to the printing mechanism such that the printing mechanism may reproduce the first rectangular data point onto the rotating media based on the position data. Subsequent rectangular data points are similarly reproduced onto the rotating media to form a copy of the image source on the rotating media. The printing is performed with a printing mechanism that prints radially relative to the rotating media.

In an alternative embodiment, a method for reproducing an image on outer surfaces of a plurality of rotating media is disclosed. The plurality of rotating media are simultaneously disposed on a rotating platter of a radial printing system. Data representing the image is received and converted into a polar-based representation of the image. A portion of a reproduction of the image is printed on the plurality of rotating media during a given rotation of the rotating platter by using the polar-based representation of the image.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, the printing system is configured to print radially onto a rotating media that may have a nonstandard shape or size, such as a label for a CD or the CD itself. The present invention takes advantage of rotational movement of the media to facilitate efficient printing. In one embodiment, the media continuously rotates below a head assembly as the head assembly radially dispenses ink onto the print media. The print head may be configured to incrementally move and print along a radial line with respect to the rotating media as the media rotates. In one embodiment, printing is continuous as the media rotates below the print head, which results in more efficient printing, in contrast to conventional printers. The printing system may also be configured to convert a rectangular based bitmap into a polar based bitmap to facilitate radial printing on the rotating media.

Figure 1:
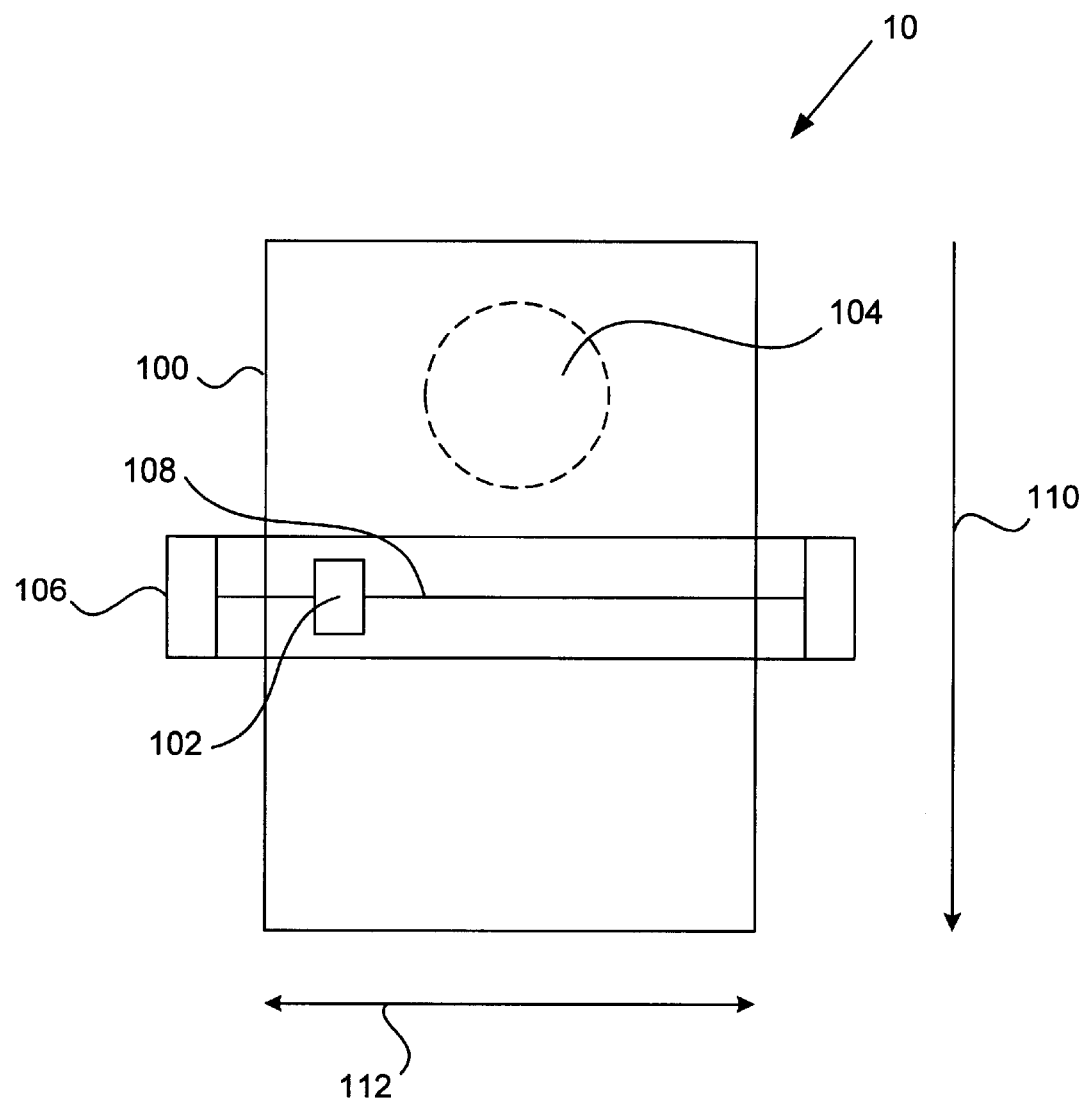
FIG. 1 represents a conventional printing system.
Figure 2:
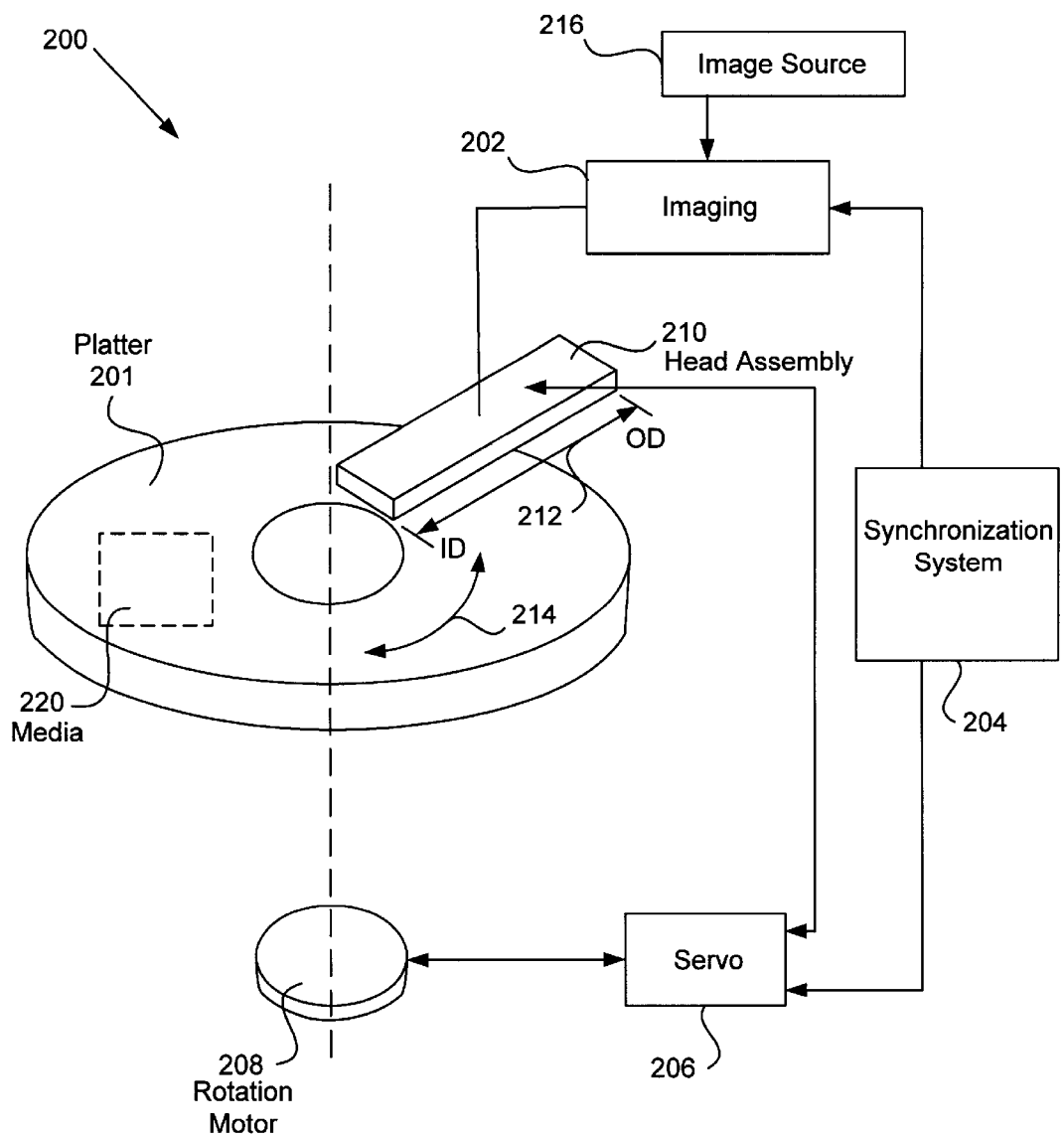
FIG. 2 is a diagrammatic representation of a radial printing system in accordance with one embodiment of the present invention.

FIG. 2 is a diagrammatic representation of a radial printing system 200 in accordance with one embodiment of the present invention. As shown, the radial printing system includes a platter 201, a head assembly 210, an imaging system 202, a rotation motor 208, a servo system 206, and a synchronization system 204.

The platter 201 represents a mechanism for supporting the media 220. Alternatively, the platter 201 itself may function as the media 220 upon which the head assembly 210 dispenses ink. In one embodiment, the platter 201 may also include a holding device for affixing the media 220 onto the platter 201. The holding device may be in any suitable form for attaching the particular type of media (e.g., 220) to the platter 201. For example, the holding device may include a vacuum, electrostatic, magnetic, or adhesive device depending on the type of media that is being attached to the platter 201. Preferably, when the media is in the form of a CD, a magnetic holding device is implemented. By way of example, a clamping mechanism utilizing magnetic clamping may be employed to trap and hold the CD to the platter surface. Additionally, the holding device may be configured to attach a plurality of media to the platter 201 at one time. For example, the platter 201 may have a plurality of regions, wherein each region implements a holding device for holding one sheet of paper or a CD. Alternatively, a single holding device may be employed to hold the multiple media on the platter 201.

The platter 201 and/or holding device are configured to accommodate media of various shapes and sizes. For example, the media may be disc-shaped, odd-shaped, flexible, rigid, thick, or thin; the media may be in the form of cardboard, paper, ceramic tiles, plastics, metals, textiles, wood, or leather. Specifically, the media may be in the form of a label for a CD, or the CD itself, that covers most of the platter surface or a small sheet of paper (220) that covers a small portion of the platter surface. These media examples are merely illustrative, and are not meant to limit the scope of the present invention.

The head assembly 210 represents a mechanism for, among other things, radially printing onto the media 220 as the platter 201 rotates to bring the printable regions of the media 220 to a position directly below the head assembly 210. As previously mentioned, the platter 201 may be configured, in one embodiment, to rotate continuously while printing takes place. This configuration is in sharp contrast with conventional printing systems, wherein media movement typically ceases altogether while printing takes place.

The head assembly 210 may also be configured to move along a radial direction 212 from the inner diameter (ID) to the outer diameter (OD), and/or vice versa, while the media 220 rotates in a circular direction 214 that may be either counter clockwise or clockwise. One embodiment of the head assembly 210 is further described below in reference to FIG. 3.

The rotation motor 208 represents a mechanism for rotating the platter 201 (and the media 220) along a circular direction 214. The rotation motor 208 is in the form of any suitable motor for rotating a platter. For example, the rotation motor 208 may be in the form of a stand alone stepper and/or encoder motor and/or a brushless DC and/or Tach loop and/or angle encoder. Alternatively, the rotation motor 208 may be implemented by an existing OEM platter rotation motor that may serve other non-printing related functions. For example, the present invention may be configured to utilize a rotation motor from an existing CD-R writer device or CD player. In one particularly advantageous embodiment, the present invention may even be integrated into an OEM device, such as a CD-R writer device to take advantage of the existing motor therein.

The servo system 206 represents a mechanism for controlling, among other things, the rotation of the rotation motor 208. To facilitate control of the rotation motor 208, the servo system 206 may receive rotation data from the rotation motor 208 that tracks a rotation position of the rotation motor 208 and/or platter 201. The rotation data may be in the form of encoder data from the rotation motor 208. Based on the position data, the servo system 206 outputs control data to the rotation motor 208. For example, the position of the rotation motor 208 may be detected and sent as encoder data to the servo system 208. The servo system 208 then adjusts the rotation position of the rotation motor 208 based on the encoder data. Thus, the servo system 206 may be employed to control the rotational speed of the rotation motor 208.

The servo system 206 may also control movement of the head assembly 210, as well as rotation of the rotation motor 208. Specifically, the servo system 206 may be configured to move the head assembly 210 to a particular position along a radial axis 212. One embodiment of the servo system 206 is further described below in reference to FIG. 4.

The imaging system 202 represents a mechanism for controlling when the head assembly 210 initiates and terminates printing a particular dot, swath, strip, or pattern that forms part of the image to be reproduced onto the media 220 as the head assembly traverses different areas of the media. The imaging system signals when to dispense the ink, for example, onto the media 220 such that a particular dot is printed onto the media 220 at a particular position. The imaging system 202 receives, analyzes, and transforms an image source 216 to determine how to control the head assembly 210. To facilitate printing onto the rotating media 220, the imaging system 202 may be configured, among other things, to convert a rectangular based bitmap into a polar based bitmap. One embodiment of the imaging system 202 is further described below in reference to FIG. 5.

The synchronization system 204 represents the mechanism for coordinating the functions of the imaging system 202 and the servo system 206 such that the head assembly 210 printing occurs at a specific position on the media 220. That is, the synchronization system 204 tells the head assembly 210 when and where to deposit a particular dot of the image source 216 onto the media 220. The synchronization system 204 may also be configured to coordinate the movements of the rotation motor 208 and/or head assembly 210 with the timing of the printing of the particular dot.

In an exemplary configuration, the head assembly 210 is positioned over the platter 201. The rotation motor 208 is coupled with the platter and the servo system 206. The servo system 206 is also coupled with the head assembly 210. The synchronization system 204 is coupled with the imaging system 202 and the servo system 206, and the imaging system 202 receives the imaging source 216.

The radial printing system 200 may be in the form of a device that is external to and coupled with a computer system. That is, the radial printing system 200 may be packaged separately or integrated into some other device, such as a conventional CD-R writing device. Preferably, if the radial printing system 200 is implemented into a conventional CD writing device, the CD also functions as the platter 201 during CD printing, as well as during conventional CD writing. If the radial printing system 200 is packaged separately, the radial printing system may also include a data input device, such as a floppy drive, to receive the image source 216. Alternatively, the radial printing system 200 may be integrated into a computer system as a peripheral device.

The radial printing system 200 may also include a media feeding device (not shown) for handling a plurality of media 220. The media feeding device may be in any form that is suitable for handling the particular type of media and that is suitable for the particular printing application. For example, for home use, a card stacker and feeder may be implemented as a media feeding device. Alternatively, a conventional CD tray may be used if the present invention is integrated into a CD writing device (i.e., of binary data onto the computer readable medium). The media feeding device may feed more than one piece of media onto the holding device of the platter 201 at one time so that multiple pieces of media may be simultaneously printed onto the platter.

Figure 3:
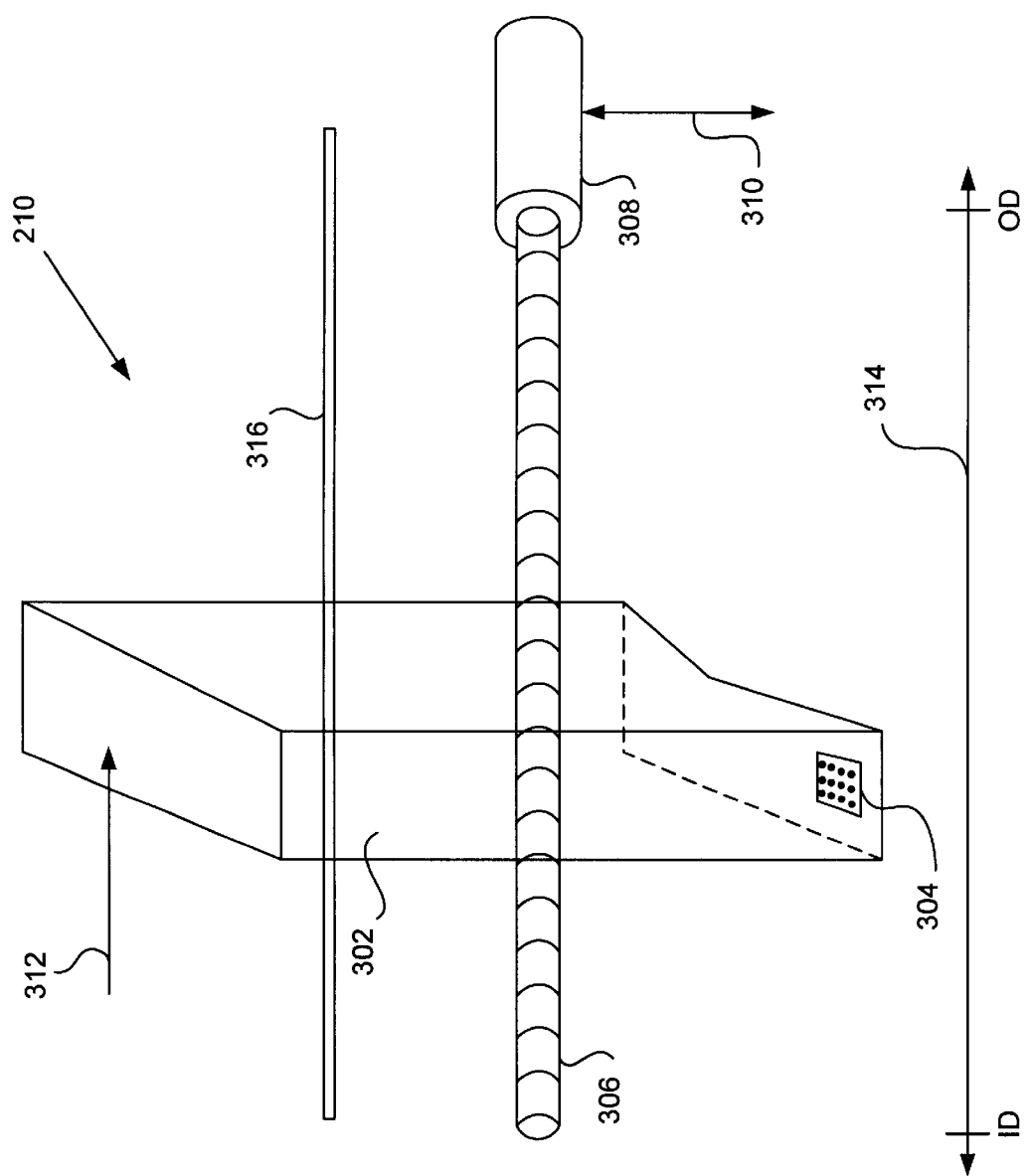
FIG. 3 is a diagrammatic representation of the head assembly of FIG. 2 in accordance with one embodiment of the present invention.

FIG. 3 is a diagrammatic representation of the head assembly 210 of FIG. 2 in accordance with one embodiment of the present invention. The head assembly 210 may be configured in any form that is suitable for printing onto a media. For example, the head assembly may implement ink jet, laser, pen, dye-sublimation, thermal transfer, electrostatic, impact, or offset printing technologies. By way of another example, the head assembly may implement digital duplication technologies, wherein the head assembly includes a master roller to duplicate an image onto a plurality of media. These types of printing technologies are well known in the art. By way of another example, the head assembly 210 may be configured to facilitate a chemical vapor deposition, photolithography, or electron beam writing process on a semiconductor wafer (e.g., when the media is a semiconductor wafer). Alternatively, the head assembly 210 may be configured to deposit a first chemical onto a media having a second chemical such that the first chemical reacts with the second chemical, resulting in a third chemical being formed on the media. In sum, the head assembly 210 may be configured in any form that is suitable for printing or forming a desired pattern of any type of material onto any type of media.

As shown, the head assembly implements ink jet technology. The head assembly 210 includes a print head 302 having a nozzle array 304, an actuator 306, a translational motor 308, and a support rail 316.

The print head 302 is in the form of a conventional ink jet cartridge. The print head 302 represents a mechanism for controlling the nozzle array 304, and the nozzle array 304 represents a mechanism for dispensing ink onto the media. The nozzle array 304 has one or more ink dispensers that are configured to print onto the media at a particular radial area, or swath as the media rotates underneath. For example, the nozzle array 304 may cover only a portion of the entire radial dimension between ID and OD of the platter 201. To print onto different areas of the media, the print head may be controlled to move radially as the media rotates. Alternatively, the nozzle area may even cover the entire radial dimension, thereby being capable of simultaneously printing at every point along a particular radius of the platter 201 (e.g., 314).

The print head 302 may be configured to receive a head control signal 312 that is output from the imaging system (e.g., 202 of FIG. 2). The head control signal 312 directs the flow of ink onto the media. One embodiment of the imaging system 202 and the head control signal 312 are further described below in reference to FIG. 5.

The head assembly 210 may implement any suitable means for radially moving the print head 302 across the rotating media. Of course, it may not be necessary to move the print head 302 if the nozzle array 304 of the print head 302 spans across the radial dimension of the platter 201 that substantially includes the entire desired radial printing area of the media 220. For example, if the nozzle array 302 spans over a radial area between ID and OD (e.g., 314), the head assembly 210 is capable of simultaneously printing along an entire radius of the media 220 on the platter 201. The fact that no mechanical movement of the print head 302 is required along the radial direction renders the system substantially more reliable and also improves the speed at which printing may be accomplished (since the swath is larger). In contrast, if the nozzle array 304 is not configured to simultaneously print along an entire radius of the desired printing area of the media 220, the print head 302 may be configured to radially move to any position between ID and OD.

Depending on the requirements of the particular application, it may be desirable to configure the head assembly 210 such that the head's radial movement is restricted. For example, for printing onto a CD, the head assembly 210 may be configured to not allow printing within the inner grooved section of the CD since it may be difficult to print on this section.

The actuator 306 and translational motor 308 represent mechanisms for radially moving the print head 302. Of course, an actuator and motor are not required if the head assembly spans the full radius of the platter or spans the entire portion of the radius that represents the printable area. The actuator and motor may be in any suitable form for radially moving the print head 302 across the platter 201. For example, the actuator 306 and translational motor 308 may be in the form of, among others, a screw drive and stepper motor, linear drive with feedback position, or band actuator and stepper motor.

As shown, the print head 302 is slidably coupled with actuator 306, which actuator 306 is coupled with the translational motor 308. The actuator 306 is supported by the support rail 316. Specifically, the actuator 306 represents a mechanism for radially moving the print head 302, and the translational motor 308 represents a mechanism for providing power to the actuator 306. As shown, the actuator 306 is in the form of a screw drive that is coupled with a translational motor 308 that is in the form of a stepper motor. Basically, each turn of the translational motor 308 moves the actuator 306, which, in turn, moves the print head 302 to a particular radial position between ID and OD.

The translational motor 308 is configured to receive a head control signal 310 from the servo system 206 and to output a head position signal 310 to the servo system 206. The head control signal 310 controls the position of the translational motor 308, and the head position signal 310 indicates the position of the translational motor 308 and corresponding position of the head assembly 210. One embodiment of the servo system 206 is further described below in reference to FIG. 4. Alternatively, the present invention may utilize motor control signals from an existing OEM device, such as a CD R-writer.

In an alternative embodiment, the head assembly 210 may include a curing bar for curing ink or a drying bar for drying ink. One or both types of bars (not shown) may be positioned over the platter 201. For example, if UV curable ink is used, a curing bar may be configured over the media 220 to cure the ink as it is deposited onto the media 220 by the nozzle array 304. By way of another example, the curing bar may be in the form of a fuser for fusing ink that is deposited by a laser type head assembly, for example, onto the media 220.

In another alternative embodiment, the head assembly 210 may also include an optical reader that represents a mechanism for obtaining optical information from the platter 201 and/or media 210. The present invention may incorporate an optical reader from an existing OEM device or may be integrated into a separate radial printer package. For example, the optical reader may be configured to scan a first printed image from the media 210 and output the first printed image in the form of an optical feedback signal to the imaging system 202. The first printed image may then be manipulated to create, for example, a second image that is different than the first image and to output the second image to the imaging system 202 in the form of a new image source 216. The second image may then be printed over the first image of the media 220. Alternatively, the first printed image may be printed onto another media 210. For example, the optical reader may scan and read a master image from a master CD and output the master image to the imaging system 202. The master image may then be duplicated on a plurality of other CD's. Advantageously, the radial printing system functions as a copier for irregular shaped media, and particularly, as a high speed copier if multiple pieces of media are arranged to be printed per rotation of the platter.

Alternatively, the optical reader may be configured to recognize a mark on the media 210 or the platter 201 to determine a reference point on the platter 201. For example, a particular mark on the platter 201 will indicate the zero angle radius of the platter 201. The reference point of the platter 201 may then be defined as a point on the platter 201 that is positioned at the zero angle radius and at an inner diameter (ID) of the platter 201. The reference point of the platter 201 corresponds to a reference point within the image source 216. Likewise, each point in the image source 216 may then be matched with a particular point on the platter, wherein each image source point is in reference to the reference point of the image source 216 and the platter 201. This reference point determination process is further described below in reference to FIG. 6.

Figure 4:
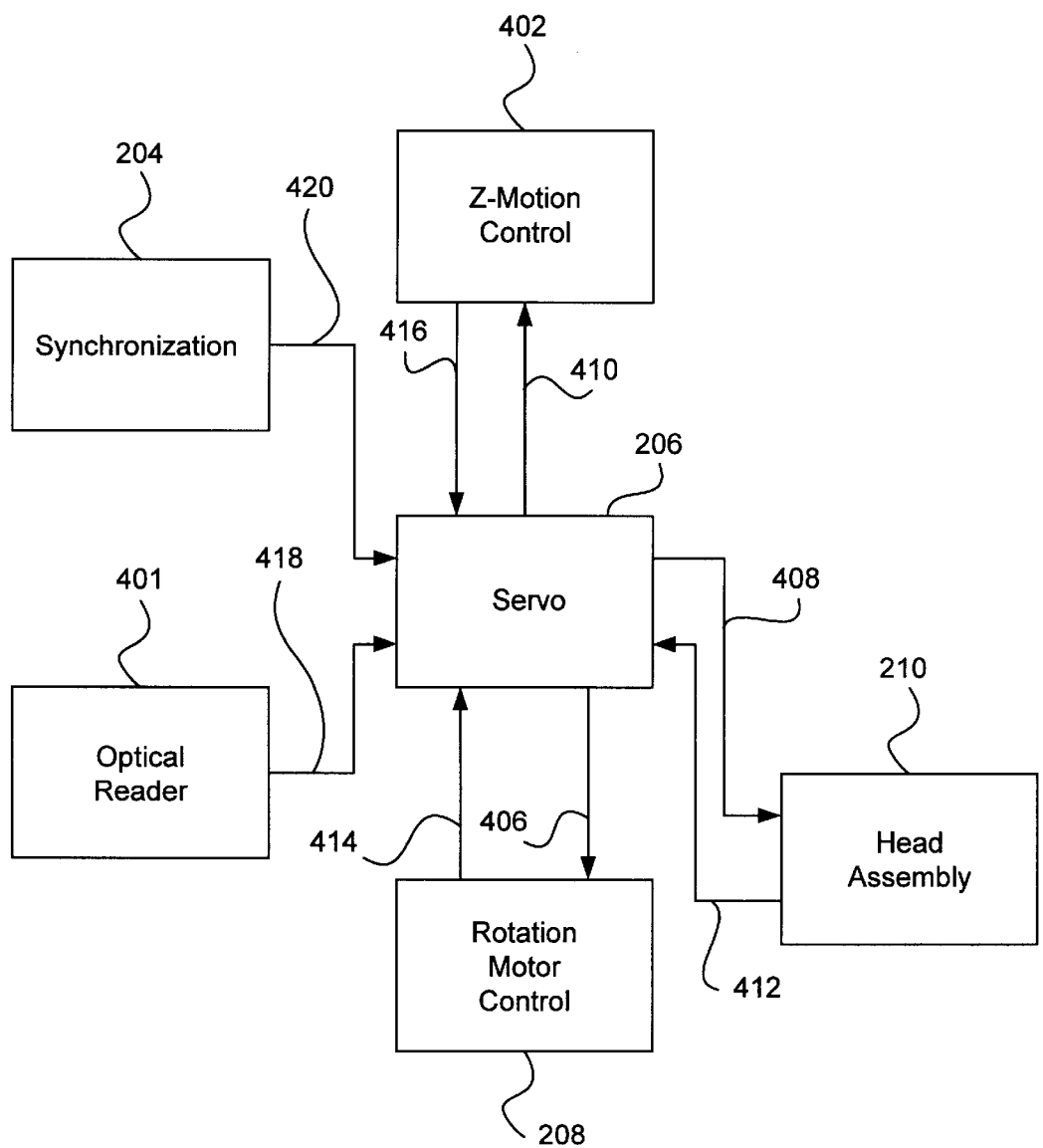
FIG. 4 is a diagrammatic representation of connections to and from the servo system of FIG. 2 in accordance with one embodiment of the present invention.

FIG. 4 is a diagrammatic representation of connections to and from the servo system 206 of FIG. 2 in accordance with one embodiment of the present invention. The servo system 206 represents a mechanism for controlling movement within the radial printing system 200. That is, the servo system 206 controls mechanical motors within the radial printing system 200.

As shown, the servo system 206 is configured to receive rotation position data 414 from the rotation motor 208. The rotation position data 414 indicates a current rotation position of the platter 201. The servo system 206 then analyzes the rotation position data 414 and outputs a rotation control signal 406 to adjust the rotation position of the platter 201 in response to the rotation position data 414.

The servo system 206 may provide a substantially constant linear rotation speed or a substantially constant angular velocity. A constant linear rotation speed may result in simplified printing control. Alternatively, the servo system 206 may provide a constant angular velocity or variable velocity. However, printing control may be more complex to compensate for distortions that may occur due to different linear velocities at different radii, which distortion is described below.

The servo system 206 may also be configured to receive head position data 412 from the head assembly 210. The head position data 412 indicates a current head position of the print head 302 of the head assembly 210. The servo system 206 then analyzes the head position data 412 and outputs a head control signal 408 to the head assembly 210. The head control signal 408 adjusts the radial position of the head assembly 210 in response to the head position data 412. Of course, as discussed above, the head assembly 210 may not necessarily be configured for radial movement. In which case, the head assembly 210 would only be controlled by the imaging system 202 and not by the servo system 206. Alternatively, the servo system 206 may be configured to move the platter 201 relative to the head assembly 210.

The servo system 206 may also be configured to receive an optical feedback signal 418 from an optical reader 401. For example, the optical reader 401 may be implemented to provide optical sensing and recognition of the media 220, such as the position and shape of the media 220. By way of another example, the optical reader 401 may scan the printed image from the media 220 and output the scanned image to the computer system so as to enable a user to view and/or manipulate the scanned image. It may then be possible to print another image, or a duplicate image, over the media 220.

The servo system 206 may also be configured to receive vertical position data 416 from a Z-motion control block 402 that moves the head assembly 210 along a vertical axis. The vertical position data 416 indicates a current vertical position of the head assembly 210. The servo system 206 then analyzes the vertical position data 416 and outputs a vertical control signal 410 to adjust the vertical position of the head assembly 210 in response to the vertical position data 416. Any suitable technologies may be implemented for detecting the vertical position, such as audio, mechanical, or optical sensors, and repositioning the head assembly 210 along the Z-axis. Of course, the Z-motion control block 402 is optional and may be quite useful for certain applications, such as three-dimensional or unusually thick media 220. Alternatively, the servo system 206 may be configured to vertically move the platter 201 relative to the head assembly 210.

The servo system 206 may also be configured to receive a synchronization signal 420 from the synchronization system 204. For example, the synchronization signal 420 may control the timing of the head control signal 408 that radially moves the print head 302, and may control the timing of the rotation control signal 406 that rotates the platter 201. It may be necessary to control the movement of the print head 302 and platter 201 to facilitate the depositing of ink at a particular location on the media 220 and platter 201.

The servo system 206 may be implemented as a stand alone device or integrated within a computer system. For example, the servo system 206 may be implemented on a peripheral board within the computer system, which board is configured to receive encoder signals from the rotation motor 208 and head assembly 210 and transmit control signals from the servo system 206. Additionally, the servo system 206 may be implemented in software, hardware, or firmware.

Figure 5:
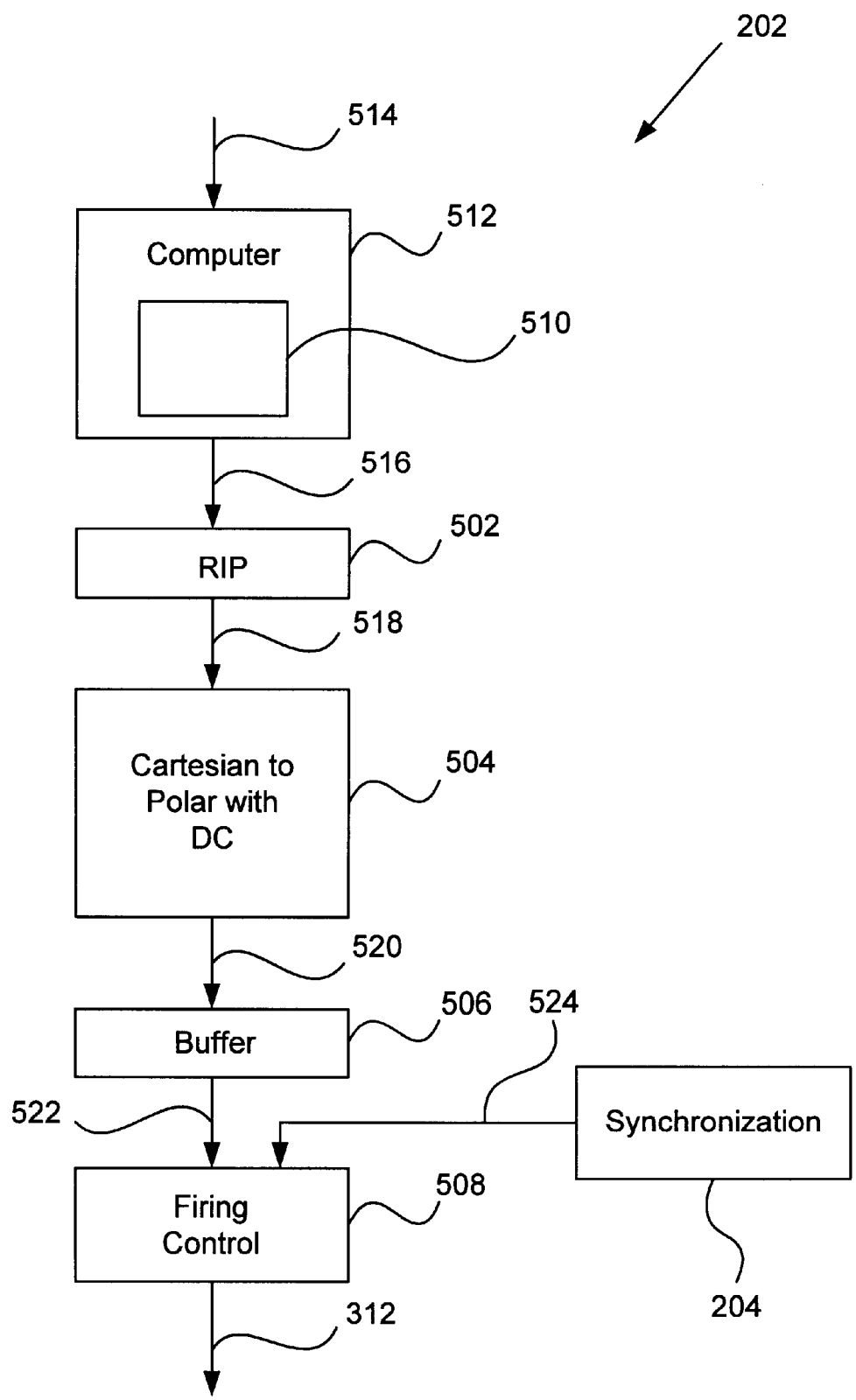
FIG. 5 is a diagrammatic representation of an imaging system of FIG. 2 in accordance with one embodiment of the present invention.

FIG. 5 is a diagrammatic representation of an imaging system 202 of FIG. 2 in accordance with one embodiment of the present invention. The imaging stem 202 includes a computer system 512 having an application program 510, a raster image processor 502, a rectangular to polar block 504, a buffer 506, and a firing control block 508.

Basically, the imaging system 202 converts an image source from the application program 510 of the computer system 512 into a set of polar based data points 522. The polar based data points 522 may then be used by a firing control block 508 for controlling the flow of ink from the head assembly 410. In other words, each polar based data point corresponds to a particular position on the platter 201. Thus, a particular polar based data point may be used to print at a corresponding position of the platter 201, which position corresponds to a specific ink dispensement area on the media 220.

Although most of the components of the imaging system 202 are described as being separate from the computer system 512, in other embodiments, some or all of these components may be integrated into the computer system 512. Additionally, in other embodiments, the components of the imaging system 202 may be separate components or integrated into one or more devices. In additional embodiments, the components of the imaging system 202 may be configured in alternative ways, such as swapping the rectangular to polar block 504 with the buffer 506.

The imaging system 202 may include the computer system 512 that has a computer application program 510 for generating and outputting an image 516. Of course, if the components of the imaging system were integrated in a computer system, there would be no need for the separate computer system 512. The image may be written in any suitable printing description language. Several well known printing description languages are QuickDraw, PostScript, and PCL.

The raster image processor (RIP) 502 is configured to convert the image 516 into a rectangular based bitmap 518. The rectangular based bitmap 518 includes an array of data points that are referenced by x-y coordinates. Most conventional printing systems use the rectangular based bitmap 518 to control printing. However, rectangular to polar block 504 provides a mechanism for converting the rectangular based bitmap 518 into a polar based bitmap to facilitate printing onto a rotating platter 201. The rectangular to polar block 504 also provides distortion correction for reducing distortion in the printed image. Two examples of image distortion problems are discussed below in reference to FIGS. 7 and 8. Additionally, a process for implementing the conversion function of the rectangular to polar block 504 are described below in reference to FIG. 6.

The rectangular to polar block 504 may be configured to receive the rectangular based bitmap 518 from the raster image processor 502. The rectangular to polar block 504 is also configured to convert data points of the rectangular based bitmap 518 into one or more corresponding polar data points. The rectangular to polar block 504 may also be configured to arrange the polar data points into a polar based bitmap 520 that is output to the buffer 506. Alternatively, the rectangular to polar block 504 may be configured to provide a print position look-up table for some or all of the rectangular data points. By way of another alternative, the rectangular to polar block 504 may not be necessary when a rectangular address look-up table is provided for each printing position on the platter 201. Both of these alternatives are further described below in reference to FIG. 6.

The buffer 506 is configured to receive the polar based bitmap 520 from the rectangular to polar block 504. The buffer 506 is also configured to arrange and/or order the polar data points of the polar based bitmap 520 such that the firing control block 508 may access the ordered data points 522 as needed for printing onto a particular ink dispensement area on the media 220. For example, the buffer 506 may arrange the polar data points such that the firing block 506 may access the polar data points for printing in sectors, similar to printing techniques employed for writing to a computer disk. In other words, the polar data points are ordered such that a first sector is accessed and printed, a second sector is then accessed and printed, etc. By way of another example, for printing one dot at a time, the buffer 506 may order the polar data points by angle of each particular radius such that each data point is printed in ascending order.

Alternatively, the buffer 506 may be configured to arrange the polar data points of the polar bitmap 520 into swaths. Each swath is defined as a region that encircles the platter 201 and encloses a printable area between two diameters, wherein the head assembly 210 is capable of simultaneously printing a set of ink dispensement areas that are positioned between the two diameters at a particular angle. Thus, the polar data points may be ordered into swath groups with the first swath group being the innermost swath and the outermost swath being the last swath group (or vice versa). Each swath group is ordered into angle groups with the first group being the zero angle, and each angle group is ordered by ascending order, for example, into a set of ink dispensement areas that are positioned between the two diameters of the swath at a particular angle. Thus, the head assembly 210 may sequentially print each set of ink dispensement areas within a particular swath.

Although the RIP 502, rectangular to polar block 504, and buffer 506 are described as being separate components from the computer system 512, some or all of these components may be integrated into the computer system 512. Additionally, these components (502, 504, and 506) may be implemented in hardware, software, or both.

The firing control block 508 is typically integral to the head assembly 210. The firing control block 508 is configured to receive the ordered data points 522 from the buffer 506 and to output an ink control signal 312 to the print head 302. The ink control signal 312 directs the timing of the flow of ink that is output by the head assembly 210 onto the media 220. The firing control block 508 may also be configured to receive a synchronization signal 524 from the synchronization system 204. The synchronization signal 524 may be used by the firing control block 508 to time the printing of a particular ink dispensement area onto the media 220 such that the particular area is printed onto a particular position on the media 220. In other words, the synchronization system 204 coordinates the firing control block's ink control signal 312 with the servo system's control signals (e.g., head control signal and rotation control signal), which directs the mechanical movement within the radial printing system 200.

The computer system 512 may also be configured to receive an optical feedback signal 514 from an optical reader. The optical feedback signal 514 represents a scanned image that was obtained by the optical reader. The optical feedback signal 514 may be used to facilitate image manipulation or changes within the computer application 510. For example, a user may overlay another image onto the scanned image, and then output the combined image as the image source 516.

Figure 6:
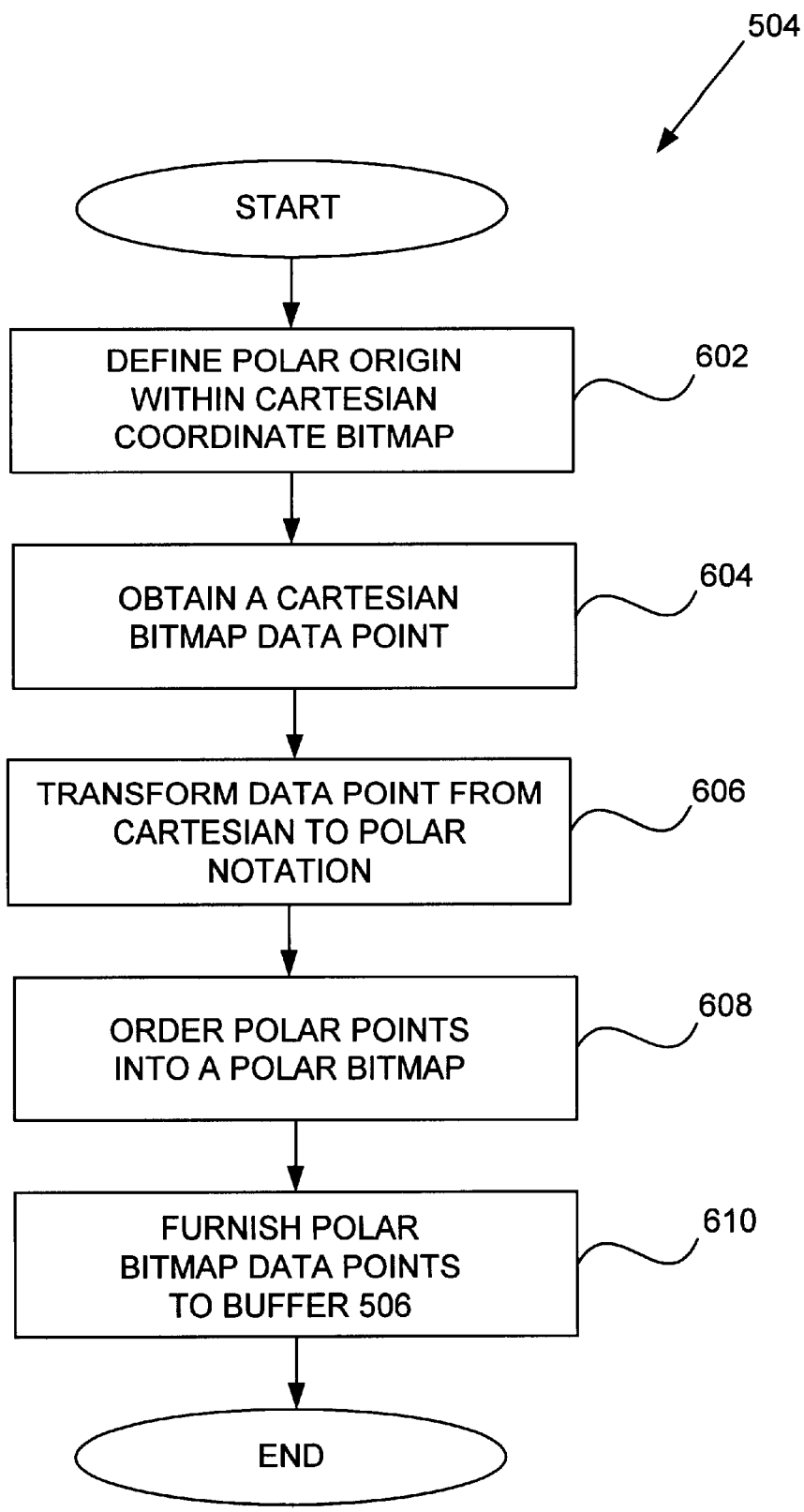
FIG. 6 is a flowchart illustrating the process of converting a rectangular based bitmap into a polar based bitmap to facilitate radial printing in accordance with one embodiment of the present invention.

FIG. 6 is a flowchart illustrating a process 600 for converting a rectangular based bitmap into a polar based bitmap to facilitate radial printing in accordance with one embodiment of the present invention. The process 600 may be implemented as rectangular to polar block 504 of FIG. 5, for example. The rectangular bitmap represents an image source that is output from a computer application program, for example, and is to be printed onto a media.

Initially, in operation 602, a polar reference point is defined within the rectangular based bitmap, and this polar reference point is mapped to the reference point of the platter 201. The reference point of the platter corresponds to, for example, either the OD or the ID of the axis of rotation of the platter 201 and to a selected radius that is defined as having a zero angle or any arbitrary point along line 212.

The zero angle radius of the platter 201 is defined by any suitable technique. For example, the zero angle radius may be defined as a particular radius on the platter 201 that is positioned below the head assembly when the rotation motor is at a particular rotation position. Alternatively, a mark on the media (e.g., a CD label) or the platter may define the zero angle radius. For example, an optical reader may be employed to find the position of the mark and define the zero angle radius.

The polar reference point may be associated with any data point within the rectangular bitmap. A reference rectangular data point that is associated with the polar reference point may be chosen arbitrarily or may be based on the size and shape of the image, as well as the requirements of the particular application of the present invention. For example, a rectangular image may be printed onto a rectangular shaped media that is offset from the center of the platter by choosing a reference data point within the rectangular bitmap that is correspondingly offset from the rectangular image. By way of another example, a circular image with a hole in the center may be printed onto a circular shaped media by selecting a reference data point within the rectangular bitmap that corresponds to the center of the hole.

By way of another example, the user may define a reference point in the rectangular bitmap such that the entire image is printed onto a printable area of the platter 201. Alternatively, the user may choose not to print the center of the image by defining the reference point in the rectangular bitmap as the center of the image such that part of the image is not printed. In this example, the center portion of the image may not be printed since the reference point may not be within the printable area.

Next, in operation 604, a rectangular based data point is obtained from the rectangular bitmap. Preferably, the rectangular data point is obtained in a some kind of logical order. For example, the rectangular data point having the lowest x-value and the lowest y-value is obtained first. The rectangular data point is then transformed into polar notation in operation 606.

Any suitable method may be used for converting the rectangular data point into one or more polar data point. That is, any method may be implemented that converts a rectangular data point that is represented by x and y coordinates into one or more polar data point that is represented by radius and angle coordinates. The following expressions are example operations for finding the radius (r) and angle (θ) coordinate of the rectangular data point:

$$r=(x^2+y^2)^{1/2}$$

$$\theta=arccos(x/r)$$

By way of another example, θ may be calculated by arctan (y/x). The polar data point is then added to a polar bitmap (e.g., 506) in operation 608. Operations 604 through 608 are then repeated for each rectangular data point of the rectangular bitmap. After all the rectangular data points are converted to polar data points and the polar data points are added to the polar bitmap, the polar bitmap is furnished to the buffer (e.g., 506) in operation 610. The buffer may then be accessed by the firing control block (e.g., 508) to print the image source onto the rotating media. Of course, each polar data point may be printed prior to obtaining the next rectangular data point from the rectangular bitmap (i.e., there may be no need, in one embodiment to wait until the entire rectangular bitmap is transformed). Additionally, if more than one piece of media is attached to the platter 201, the polar data points may be arranged in the polar bitmap to print an identical image onto all media pieces, or to print different images onto the media pieces (by appropriately referencing the polar reference point to the rectangular reference point).

Preferably, a print position look-up table may be implemented to store print positions on the platter, for example, corresponding to the rectangular data points of the image. That is, the print position look-up table includes position data for representing a rectangular data point onto the platter 201. The print position look-up table may include print position data for all possible rectangular data points or for a portion of all possible rectangular data points, wherein simple conversion calculations are used to obtain print position data for non-stored rectangular data points based on stored position data. For example, print position data may be stored for one quadrant, and other non-stored quadrant position data is obtained by simple reflection techniques. Of course, some rectangular data points may have no printed counterparts for distortion correction purposes. Thus, during the printing process, each rectangular data point does not have to be converted into a polar data point. Instead, polar data is calculated prior to printing and provided within the print position look-up table. During printing, print position data for each rectangular data point on the platter 201 is obtained from the print position look-up table. This technique requires less computations during the printing process than the previously described technique of FIG. 6 since a polar data point is not generated for each rectangular data point.

Preferably, a rectangular address look-up table may be utilized to store addresses of associated rectangular data (e.g., the color of an associated dot) for each print position on the platter 201. Thus, prior to printing a particular dot or print area, the associated rectangular data is obtained for the particular dot or print area by referencing the rectangular address look-up table. In other words, the location of the associated rectangular data in the rectangular bitmap is obtained from the rectangular address look-up table for each dot or print area, the associated rectangular data is then obtained, and the associated rectangular data is printed for the particular dot or print area. This technique has the advantage of utilizing less storage space for the data points than the above embodiments since an image stored in rectangular notation may be more compact than an image stored in polar notation.

Operation 606 may also include techniques for correcting printing distortion that may occur in radial printing. For example, one type of distortion may occur when more than one dot is printed at one time onto a radial line of the media. The dots of a first radial line will not all be printed at a same distance from the dots of an adjacent second radial line. In other words, the outer dots of two adjacent printed lines are farther apart than the inner dots because of a difference in linear velocity between dots at different radii and the resulting time differences for the ink to reach different dots at different radii. By way of example, for a wide swath that is positioned close to the origin of the rotating platter, two printed lines may diverge such that a gap is present between the two printed lines.

Figure 7:
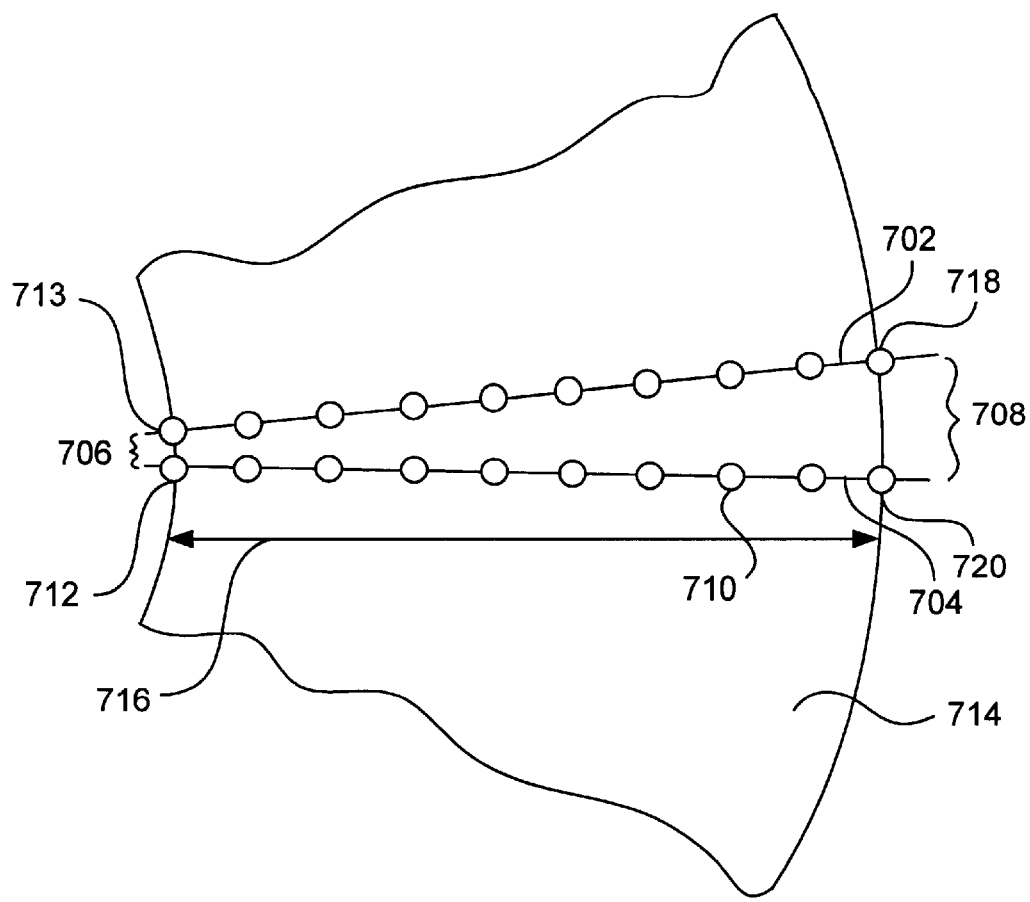
FIG. 7 is a diagrammatic representation of wide-swath, radial dependent distortion.

FIG. 7 is a diagrammatic representation of this large swath, radial dependent distortion. As shown, a swath 714 that may be located near the innermost portion of the platter 201 has two printed lines 702 and 704 that are separated by a radial dependent distance. As shown, a dot 713 of printed line 702 is separated from a dot 712 of printed line 704 by a distance 706, while a dot 718 of printed line 702 is separated from a dot 720 of printed line 704 by a distance 708. The distance 706 between the inner pair of dots is smaller than the distance 708 between the outer pair of dots. This distortion tends to be less significant for swaths that are located on the outer portion of the platter or for swaths with narrow widths.

A second type of distortion occurs when some of the rectangular data points of an image cannot match up to any of the available polar coordinates. A limited number of polar data points may be available since the angles of the polar data points are typically represented by digital values (e.g., quantized). In other words, the limited number of polar data points may fail to match up with all of the rectangular data points.

Figure 8:
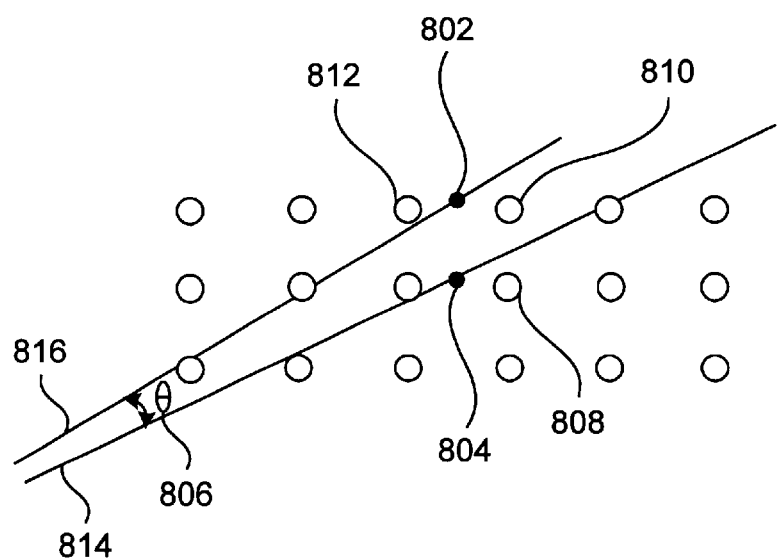
FIG. 8 is a diagrammatic representation of mismatches between image points and printing points along quantized angles.

FIG. 8 is a diagrammatic representation of mismatches between rectangular data points and polar data points along quantized angles. As shown, printed lines 814 and 816 are separated by a minimum predefined angle 806 due to quantization. Because of the quantization of print angles, printed lines 814 and 816 cannot reference certain rectangular data points. For example, rectangular data points 808, 810, and 812 cannot be exactly matched to any polar data point along printed lines 814 and 816. Thus, some estimations must be made to map these rectangular data points onto the printed lines 814 and 816. As shown, rectangular data point 808 is mapped onto polar data point 804 on print line 814, and rectangular data points 810 and 812 are both mapped onto polar data point 802 on print line 816.

This "mismatch" distortion, as well as the "large swath" distortion, may result in a printed image that appears to includes a plurality of white spots or gaps that are inappropriately scattered throughout the printed image. More specifically, the "large swath" distortion may result in "pie-shaped" gaps within a portion of the printed image that is located near the axis of rotation. If the number of gaps or white spots within the printed image are significant, they will likely detract from any other desirable characteristics of the printed image and/or cause the printed image to not look right.

A third type of distortion that may occur in radial printing is referred to as twisting distortion, which occurs when the ink is deposited at points on the media having various linear velocities, for example, when the media is rotated at a constant angular velocity. For example, for a CD the center of the disk is rotating at a slower linear velocity than the outer edge of the CD. Thus, dispensing the ink at a uniform rate results in a printed image that appears twisted within the inner portion of the image.

Figure 9:
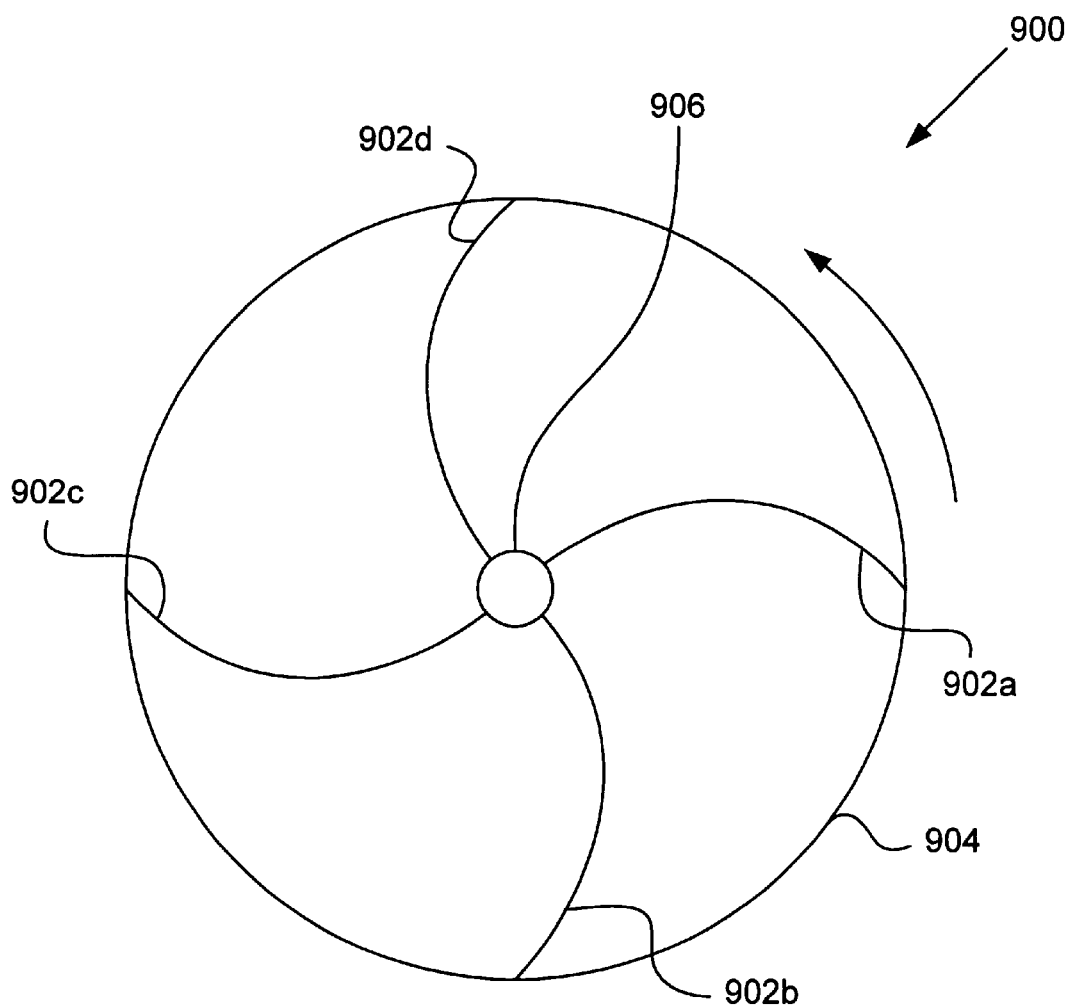
FIG. 9 is a diagrammatic representation of twisting distortion 900 on a CD, for example.

FIG. 9 is a diagrammatic representation of twisting distortion 900 on a CD, for example. As shown, a CD 904 has a plurality of radially printed lines 902 that have a twisting distortion. Without the twisting distortion, these radially printed portions would appear straight. That is, ink would be dispensed along a radial line of the CD without the twisting distortion effect. The resulting "twisting" distortion in the printed image may be noticeable by the user or may be undetectable, depending on the complexity of the image source.

Dual conversion distortion is a fourth type of distortion, which is the result of multiplicative errors from conversion processes (e.g., converting the image source into a rectangular bitmap and converting the rectangular bitmap into a polar bitmap). The dual conversion distortion results in blurry edges on polygons or alphanumeric characters, for example, since errors in the relative placement of each dot may occur with each conversion of each image pixel into an associated printable polar data point. The blurry edges may be acceptable in particular printed images, such as a bitmap image of a photo. However, in certain applications, the dual conversion distortion may result in an unacceptable printed image with unacceptably jagged, blurry text or shapes.

Figure 10:
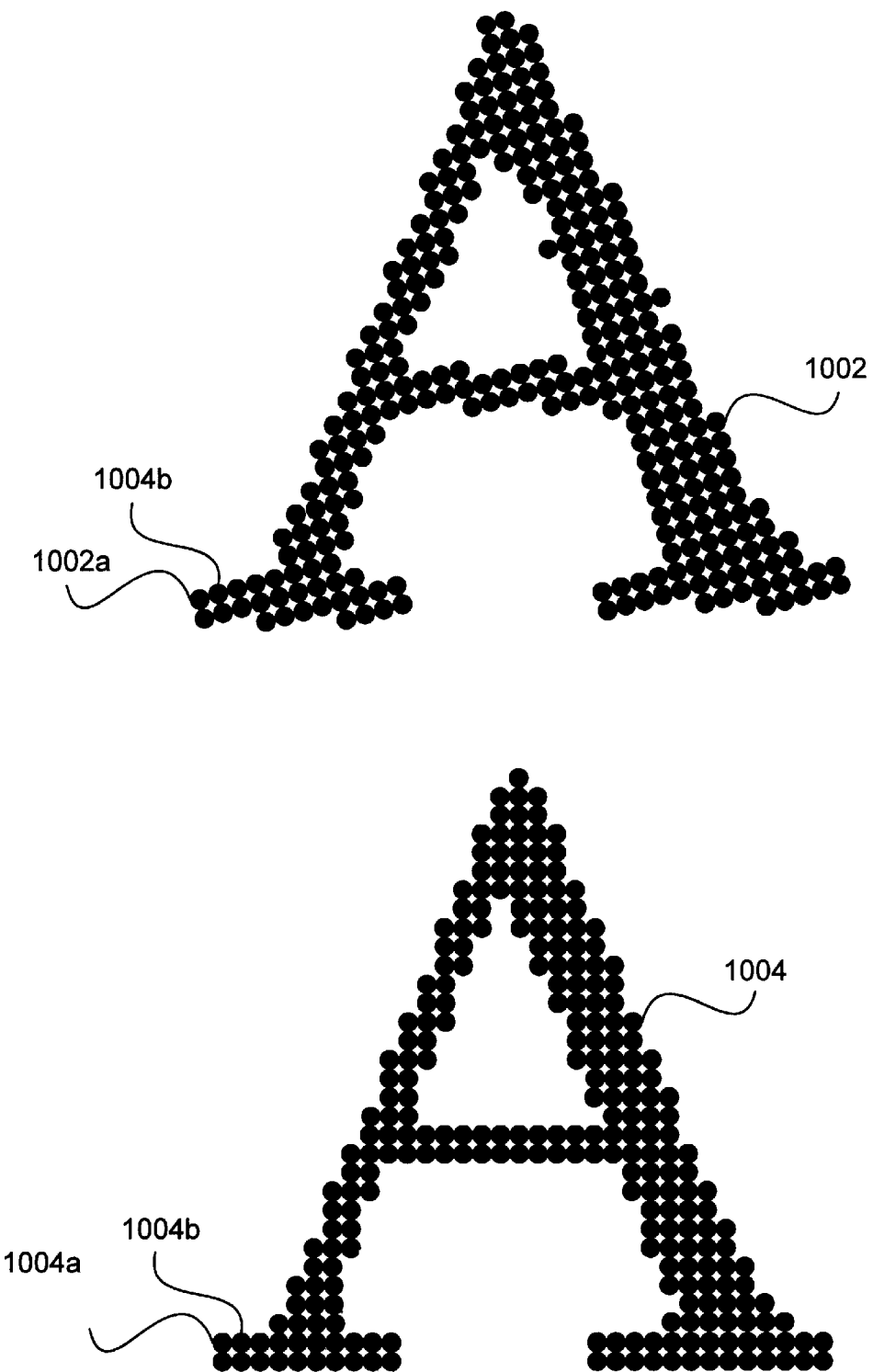
FIG. 10 is a diagrammatic representation of a character "A" that has been converted into a plurality of rectangular dots and plurality of polar dots.

FIG. 10 is a diagrammatic representation of a character "A" that has been converted into a plurality of rectangular dots 1004 and plurality of polar dots 1002. As shown, a first conversion distortion is present when the "A" is mapped onto a plurality of rectangular dots 1004. For example, the "A" has uneven or "ragged" edges, wherein the dots do not align. This first distortion is caused by mapping each pixel of the data source to a closest rectangular dot position. This mapping may not necessarily result in smooth edged polygons or alphanumeric characters, for example. A second distortion occurs when the rectangular dots 1004 are mapped to polar dots 1002 within a rotated grid. For example, first rectangular dot 1004*a* is mapped to a first polar dot 1002*a*.

Unfortunately, since the polar dots are in a radial pattern, a second rectangular dot 1004*b* must be mapped to a second polar dot (e.g., 1002*b*) that is positioned lower or higher than the first polar dot 1002*a*. Thus, the polar "A" (without correcting for distortion) contains mapping errors inherent in calculating positions for the rectangular dots 1004 of the rectangular "A", as well as mapping errors inherent in converting the rectangular dots 1004 into polar dots 1002. In sum, the "A" that is printed onto the rotating media may not appear as sharp or crisp as the image source "A".

A number of techniques may be utilized to correct the above distortion problems that are associated with radial printing. The following Table 1 summarizes various techniques for correcting or improving one or more of the above described distortion problems:

TABLE 1

Summary of Distortion Solutions

| Distortion Solution | Distortion Types | | | |
|---|---|---|---|---|
| | Large Swath | Mismatch | Twisting | Dual Conversion |
| High resolution | X | X | | X |
| Angled printhead | X | X | | X |
| Linear Motor (Optical Feedback) | X | X | | X |
| Small steps on Stepper Motor | X | X | | X |
| Greater angle resolution | X | X | | X |
| Custom Driver | | | | X |
| Slow RPM, | | | X | |
| Constant linear velocity | | | X | |
| Larger dot size | X | X | | |
| Low radius fill-in | X | | | |
| Other ink shapes | X | | | |
| Nozzle Firing Time Adjustment | X | | X | |

For each possible distortion solution, an "X" in Table 1 represents a potentially effective solution for one of the four above described distortion problems. One or more of these distortion solutions may be implemented, alone or in combination, in the present invention depending upon the particular application requirements.

One general solution for reducing the large swath, mismatch, and dual conversion distortions is to increase the print resolution. That is, in one embodiment of the present invention, the radial printer may be configured to print with a relatively high resolution such that the large swath, mismatch, and dual conversion distortions are significantly reduced or de-emphasized. For example, the mismatch distortion may be reduced with a relatively high resolution since the rectangular data points may be more accurately mapped to a larger pool of polar data points. By way of another example, the large swath and dual conversion distortion may be undetectable at relatively high resolutions. That is, gaps between printed dots or areas may not be noticeable if the printed dots are spaced closer together.

An effective way to increase printing resolution is to increase the capabilities of the head assembly, e.g., a higher dots per inch (dpi) capability. Another technique for increasing the resolution in one direction is to permanently angle the print head such that more dots may be printed per radius, for example. In another embodiment, a linear motor with optical feedback to detect the print assembly's radial position may be utilized to synthetically enhance resolution by angling the sensors that detect the print assembly's position. In other words, the angled sensors of the print assembly would allow a relatively high resolution for print assembly position. Another technique or configuration for increasing resolution is to implement a stepper motor that is capable of moving the print assembly in relatively small steps or increments.

Alternatively, the angular resolution may be increased to reduce the large swath, mismatch, and dual conversion distortions. For example, the angular resolution may be increased such that the image source is printed on the media after one full rotation of the print head, and a second rotation of the print head is then used to fill in any unwanted gaps caused by large swath, mismatch, or dual conversion distortion. That is, for the second rotation, the print head is offset from the previous location of the print head during the first rotation. By way of example, if it is determined that one minute of arc is needed to print the image source onto the media, a 30 second arc offset may be utilized for the second rotation for printing between the dots printed during the first rotation. This method is especially advantageous when there is a limit to how fast ink may be dispensed for a given rotation speed. For example, if ink can only be dispensed every 1 minute of arc, a second print rotation that is offset from a first print rotation allows for finer resolution between dots or print areas.

An alternative to increasing the overall resolution is to only increase the resolution for certain portions of the media. For example, a higher inner resolution may be utilized for inner radii to print within gaps that are the result of large swath distortion. Another technique for reducing large swath distortion by filling in the gaps between inner radii is to print stripes or other shapes during inner radii printing or during all printing. For example, the printed stripes would help to fill in the gaps from large swath distortion. Stripes may be achieved by increasing the ink dispensement timing, for example.

A solution that may reduce the dual conversion distortion is to implement a custom driver that is capable of accurately converting image shapes into a polar data points. The custom driver would include algorithms for converting known shapes (e.g., polygons) into a set of polar data points with substantially the same shape as the shape of the image source. For example, a custom driver may convert a rectangle's corners into polar data points and calculate positions for data points within the remaining square's sides based on the corner's polar data points.

The present invention may also implement similar linear velocities or relatively slow speeds for each position along the radii to reduce or eliminate the twisting distortion. The linear velocities may be equal or merely similar enough such that the twisting distortion is undetectable by the human eye. If the platter rotated at a constant linear velocity, for example, the time between the ink dispensement and the ink contacting the media would not substantially vary with different radii distances. That is, the ink would hit the media after a predictable and constant delay after ink dispensement. Thus, distance between the inner portions of the radii would not be substantially different than the outer portions of the radii, and the printed radii would not appear twisted.

In an alternative embodiment, printing areas may overlap on the media. For example, the print dots may be sized such that each dot overlaps with the adjacent printed dot. Overlapping print areas may be achieved by any suitable techniques or configurations of the present invention so as to reduce large swath and mismatch distortions. For example, the print assembly (and firing control) may be configured to dispense ink in large enough quantities to cause overlap to occur between adjacent print areas.

To reduce large swath distortion and twisting distortion, a variable firing time may be implemented. That is, ink dispensement may be carefully controlled such that large swath and/or twisting distortions are undetectable. Large swath and/or twisting distortion effects may be predicted for each dot or printing area of the media and then used to calculate an appropriate ink firing delay such that each dot is printed without any significant or detectable large swath and/or twisting distortion. For example, the firing delay may be changed at a constant rate as dots are printed along a radius to reduce the twisting distortion. By way of another example, a nozzle firing delay may be chosen for inner dots such that gaps would not be detectable that were due to large swath distortion.

The current invention has many advantages. The present invention is capable of printing onto media having various sizes, shapes, and compositions. That is, since the position of the head assembly 210 is based on each polar based data point corresponding to an associated ink dispensement area on the platter 201, the head assembly 210 is capable of readily dispensing ink onto any media type that is positioned over an associated ink dispensement area. For example, the present invention may be used for printing onto a CD or CD label. The CD may be placed onto the platter 201, and the platter is then rotated below the head assembly 210. As the CD rotates below the head assembly 210, the print head 302 efficiently dispenses ink onto the rotating CD. Additionally, the present invention may be used for printing on small sized media that are attached to the platter (e.g., by vacuum suctioning) and rotated below the print head 302.

The present invention also provides a simple mechanism for printing. For example, the present invention implements rotational motion, which is achieved with inexpensive components, such as a flywheel device. Additionally, the head assembly may move in a slow steady manner by being incrementally moved along a radial line relative to the rotating media. That is, the present invention has the advantage of efficiently utilizing the substantially continuous rotational movement of the media for printing, as compared with conventional systems that stop printing while the media is moved to a new position below the head assembly.

Additionally, the platter 201 provides a relatively stable base for the media 220. In other words, the media 220 is affixed to a stable rotating platter 201 such that a particular point on the media 220 may be repeatedly rotated to the same position below the head assembly 210. Thus, the relative stability of the media 220 allows the head assembly 210 to accurately reprint onto the same location on the media 220. For example, for color printing, more than one color may be printed onto one ink dispensement area on the media 220. Additionally, the relative stability of the media 220 allows the head assembly 210 to accurately print in sectors, for example, with few registration problems. In sum, the relative stability of the media 220 allows for increased printing efficiency and accuracy.

Additionally, if the platter 201 of the present invention is configured to have a holding device that affixes a plurality of media 220 onto the platter 201 at one time and a media feeding device that feeds a plurality of media onto the holding device, the present invention will be capable of high speed printing.

While this invention has been described in terms of several preferred embodiments, there are alterations, permutations, and equivalents which fall within the scope of this invention. For example, multiple print heads may be implemented and placed at multiple radial and axial positions. It is therefore intended that the following appended claims be interpreted as including all such alterations, permutations, and equivalents as fall within the true spirit and scope of the present invention.

What is claimed is:

1. A radial printing system for receiving an image source representative of an image to be printed on a rotating media, the image source having a plurality of image points expressed in Cartesian coordinates, the system comprising:
   a computer imaging system configured to convert the plurality of image points expressed in Cartesian coordinates into a plurality of polar image points expressed in polar coordinates, wherein each polar point corresponds to a location on the media,
   wherein the computer imaging system is further configured to control printing distortion by selecting a first portion of the polar points that correspond to a first radius of the media and selecting a second portion of the polar points that correspond to a second radius of the media, a higher proportion of the polar points corresponding to the first radius being selected than of the polar points corresponding to the second radius; and
   a head assembly coupled to the computer imaging system for outputting an ink object along the first radius of the rotating media for each polar point within the selected first portion and outputting an ink object along the second radius for each polar point within the selected second portion.

2. A radial printing system as recited in claim 1, wherein the first portion of polar points are selected to have a higher angular resolution than the second portion.

3. A radial printing system as recited in claim 2, wherein the first radius is a higher value than the second radius.

4. A radial printing system as recited in claim 3, wherein the first portion includes substantially all of the polar points corresponding to the first radius and the second portion is a subset of the polar points corresponding to the second radius.

5. A radial printing system as recited in claim 4, wherein the second portion is selected by discarding polar points so that overlapping of ink objects is minimized.

6. A radial printing system as recited in claim 1, wherein the ink objects at the first radius have a larger size than the ink objects at the second radius.

7. A radial printing system as recited in claim 1, wherein the ink objects at the first radius have a stripe shape, and the ink objects at the second radius have a dot shape.

8. A radial printing systems as recited in claim 1, wherein the rotating media is a compact disc (CD).

9. A radial printing system as recited in claim 1, further comprising:
   a position sensor for sensing a plurality of angular positions at a plurality of times and outputting the angular positions to the computer imaging system,
   wherein the computer imaging system is further configured to receive the angular positions and determine a first ink dispensement time for the first radius of the media and a second ink dispensement time for the second radius based on the sensed angular positions,
   wherein the head assembly receives the first and second ink dispensement times and outputs the first ink objects along the first radius at the first ink dispensement time and the second ink objects along the second radius at the second ink dispensement time,
   wherein the first and second ink dispensement times are determined such that the first and second ink objects hit the media at about the same angle on the media.

10. A radial printing system as recited in claim 9, wherein the media is a CD having a mark detectable by the position sensor so as to provide a reference for the determined angular positions.

11. A radial printing system as recited in claim 1, further comprising:
   a rotation motor for rotating the platter; and
   a servo system for controlling the rotation motor,
   wherein the media represents a CD and the rotation motor is in the form of the motor employed to rotate the CD during recording of digital data onto the CD.

12. A radial printing system as recited in claim 1, wherein the head assembly includes an ink jet print head.

13. A radial printing system recited in claim 1, wherein the head assembly includes a curing bar for curing ink that is printed onto the rotating media.

14. A radial printing system recited in claim 1, wherein the head assembly includes a drying bar for drying ink that is printed onto the rotating media.

15. A radial printing system recited in claim 1, wherein the head assembly includes an optical reader for retrieving optical information.

16. A radial printing system recited in claim 1, wherein the computer imaging system further includes a buffer for arranging the polar data points of the polar based bitmap to facilitate printing onto the media.

17. A radial printing system recited in claim 1, wherein the computer imaging system is configured to reduce printing distortion of one from a group consisting of large swatch, mismatch, twisting, and dual conversion distortion.

18. A radial printing system recited in claim 1, wherein the computer imaging system is configured to reduce large swatch, mismatch, twisting, and dual conversion distortion.

19. A method for reproducing an image on a rotating media, comprising:

receiving a plurality of Cartesian image points representing the image;

converting the image points into a plurality of polar image points;

selecting a first portion of the polar points that correspond to a first radius of the media;

selecting a second portion of the polar points that correspond to a second radius of the media, wherein a higher number of the polar points corresponding to the first radius are selected than of the polar points corresponding to the second radius;

printing an ink object along the first radius for each polar point within the selected first portion; and printing an ink object along the second radius for each polar point within the selected second portion.

* * * * *